Oct. 14, 1952
T. B. CRAWFORD
2,613,637
LID FOR SUSPENDED MILKERS
Filed Nov. 18, 1949
2 SHEETS—SHEET 1
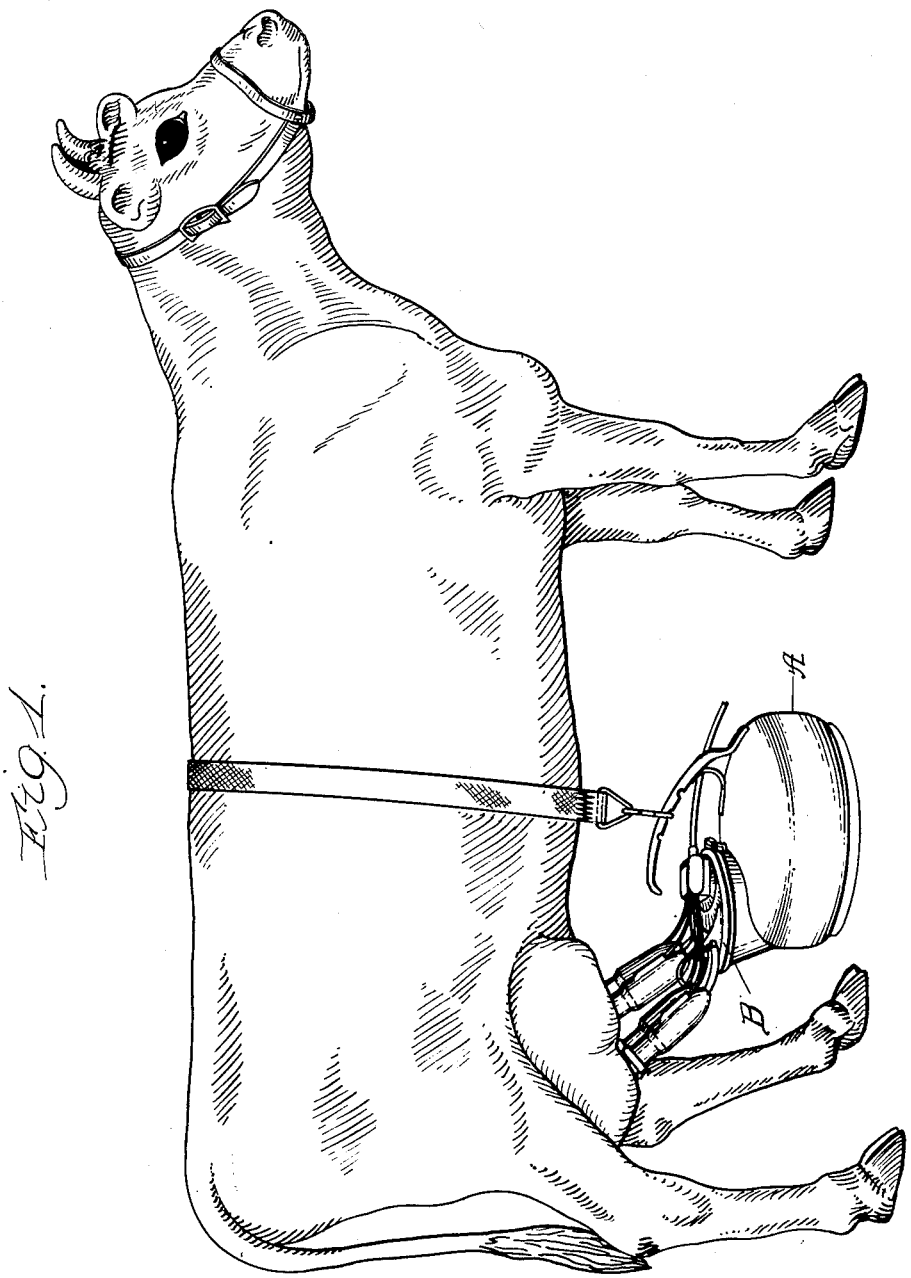

Oct. 14, 1952     T. B. CRAWFORD     2,613,637
LID FOR SUSPENDED MILKERS
Filed Nov. 18, 1949     2 SHEETS—SHEET 2
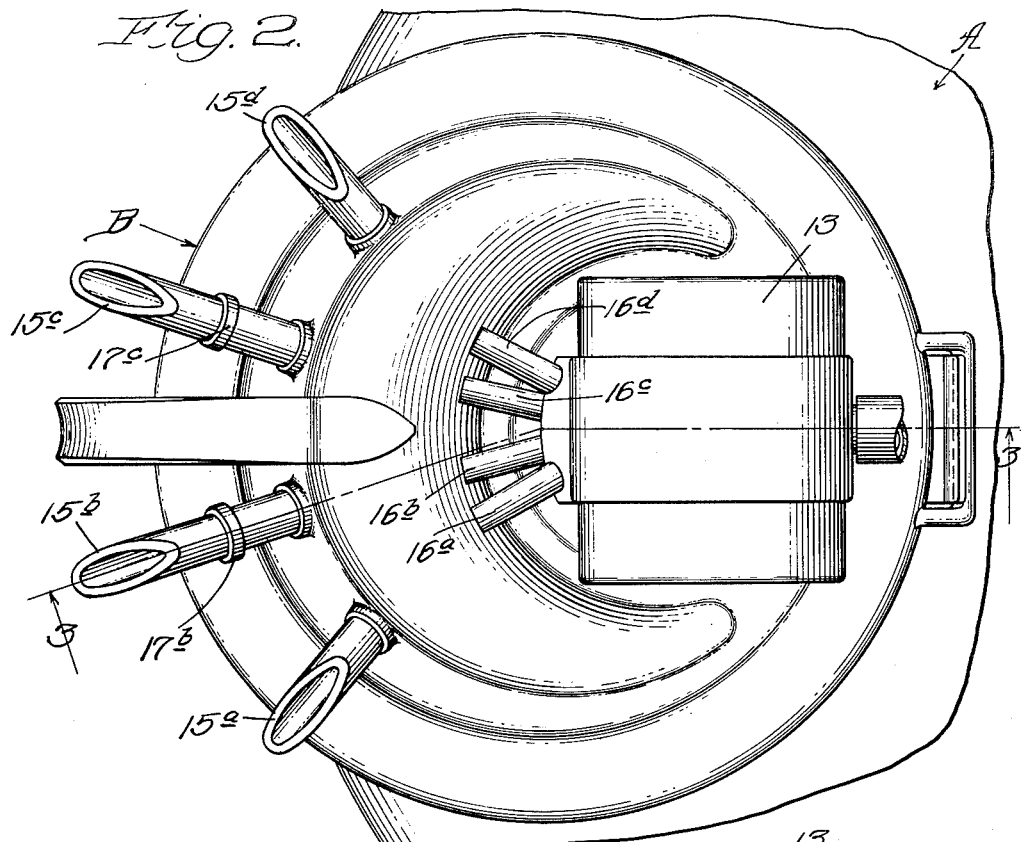
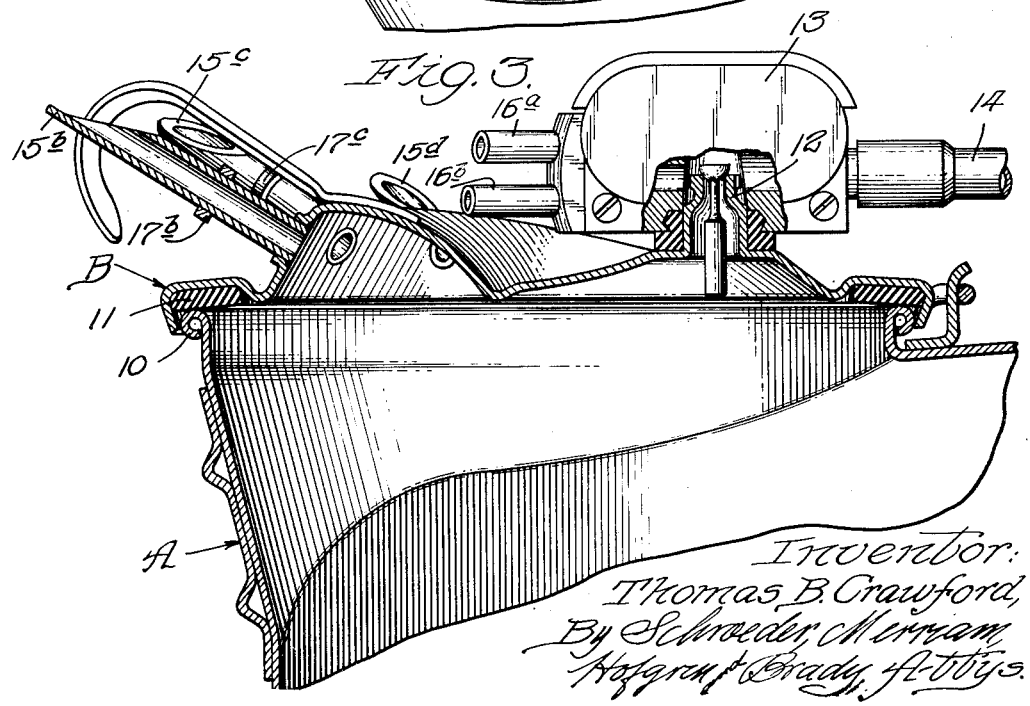
Inventor:
Thomas B. Crawford,
By Schroeder, Merriam,
Hofgren & Brady, Attys.

Patented Oct. 14, 1952

2,613,637

UNITED STATES PATENT OFFICE 2,613,637

LID FOR SUSPENDED MILKERS

Thomas B. Crawford, Arcadia, Calif., assignor to Babson Bros. Co., a corporation of Illinois Application November 18, 1949, Serial No. 128,111

6 Claims. (Cl. 119—14.46)

This application relates to a milker and more particularly to an improved arrangement and spacing of milk tube connector nipples for a suspended milker.

Milkers of the suspended type have been in commercial use in this country for more than two decades, and since their general construction and operation is well known in the art, and has been the subject of a number of issued patents, it will not be described in detail here. If desired the brief reference to the general construction and operation contained in this specification may be supplemented by reference to issued patents, as for example, McCornack Patent 1,859,213.

One feature of the present invention is to provide an improved location and relation of the ends of the milk tube connector nipples of a suspended milker, and particularly in the provision of certain nipples having their ends differently spaced from an arc than other nipples; another feature of this invention is the location of the four connector nipples on an arc on a part of a suspended milker, preferably the lid, with the two center nipples being substantially longer than the two outer nipples; yet another feature of this invention is the arrangement of nipples heretofore described not only radially in an arc, but with a more widespread spacing than has heretofore been common; and still another feature of this invention is the provision of stop elements on the longer nipples to prevent the milk tubes from being forced on them further than is desirable.

Other features and advantages of this invention will be apparent from the following specification and the drawings in which:

Figure 1 is a side elevational view of a cow and a suspended milker of a character adapted to have this invention embodied therein;

Figure 2 is a fragmentary top plan view, on an enlarged scale, of the lid and adjacent portion of the bucket of the milker shown in Figure 1; and Figure 3 is a partial vertical sectional view taken along the line 3—3 of Figure 2.

The pail or bucket of a suspended milker as the bucket A, generally comprises a round vessel of lesser height than diameter and adapted to receive 40 or 50 pounds of milk. As illustrated, the bucket is provided with an opening at the top toward the rear of the cow, this opening having a diameter in the neighborhood of but generally slightly less than one-half that of the milker bucket. This opening, during milking, is closed by a lid B which carries the pulsator for providing intermittent pulsation cycles of vacuum and atmospheric pressure. The lid has connector nipples adapted to receive the milk tubes of the inflations or flexible linings in the teat cup shells and the pulsator provides another set of connections with the shells. In accordance with conventional double acting milking machine operation, a vacuum is then pulled steadily in the interior of the milker pail, this vacuum being available for action on the end of the teats through the milk tubes leading from the interior of the milker pail, and vacuum and atmospheric pressure are automatically intermittently applied between the rigid shell and the flexible body of the inflation to achieve a collasping and expanding of the inflation around the teat.

As has been fully set forth in the above mentioned McCornack patent, and other issued patents, milkers of the type here illustrated, when suspended and operated in the manner intended, provide an intermittent downward and forward tug and pull on the teats during milking. In order to enable this pull to be correctly applied to the teats, the connector nipples have heretofore been generally arranged in a small arc at the back of the lid, and at a rather small angle to the plane of the lid, commercial milkers of this type having had for sometime the nipples at an angle of about 22½° to the plane of the lid.

The udder of the normal cow has rear quarters which are substantially larger than the front quarters. In fact, the average cow gives about 60% of the milk of any one milking from the rear quarters and only about 40% from the front quarters. For this reason I prefer to apply more of the pull of the milker during the operation to the rear quarters, in order to have the various quarters milk out more nearly at the same time.

It has been customary to mount the milk tube connector nipples on the lid of a suspended milker in a small segment of an arc, with all of the tubes being of equal length. I have found that, with inflations and their integral milk tubes all of uniform size, I can do a better job of milking, particularly on cows which have a relatively "square" set of even teats, a relatively horizontal udder floor, by having the two center nipples of greater length than the outer nipples, and by spreading the nipples somewhat wider than was heretofore customary. While a greater amount of pull on the back teats than on the front teats is desirable, there must always be a substantial pull on the front teats or the teat cup assemblies will creep up undesirably and tend to injure delicate membranes at the top of the teat. For convenience of assembling the milker and having the milk tubes and teat cup assemblies for the back teats clear those for the front teats, I find it desirable to retain the arcuate arrangement of connector nipples but to achieve this desired but somewhat different distribution of pull by widening the arc and making the two center nipples of different length than the two outer nipples.

I have found it desirable to make the center nipples between ¼ and ¾ inch longer than the outer nipples, preferably about ½ inch longer effectively; and to spread the nipples so that the arced segment covered by them is greater than 90°, preferably in the order of 110° or slightly more. This arrangement not only distributes the pull between the teats in a more desirable manner over a greater variety of udders, but also tends to avoid slacking off of the front tubes with possible choking off of flow therethrough, and also avoids too sharp a forward angle of pull on the back nipples.

Referring now more particularly to the details of construction here illustrated in Figures 2 and 3, the milker A is shown as having a round top opening surrounded by the rolled bead or flange 10. The lid B rests on this flange and closes the opening, a satisfactory seal being provided by the gasket 11. The particular lid illustrated embodies inventions which are not here described and claimed inasmuch as they are the subject of other copending applications, particular reference in this regard being made to Thomas application D.146,495, filed May 20, 1948, now matured into Patent No. D.156,852.

The front portion of the lid is provided with a pulsator post 12 which supports the pulsator 13 and which acts as a vacuum passageway between the interior of the pail and passageways in the pulsator communicating with the vacuum hose 14, which would normally be connected to a stall cock in a vacuum line or to some other appropriate source of vacuum for operating a machine. The rear portion of the lid is provided with connector nipples 15a—d, these being the nipples with which I am here particularly concerned. In operation, as may be best seen in Figure 1, the milk tube or stem portions of the inflations are slipped over the generally tubular connector nipples 15, the angular cut of the operating end of the nipples providing an automatic cut-off for purposes more fully described in the aforementioned McCornack patent. As may be also seen in Figure 1, other tubes connect the shells of the teat cup assemblies to the pulsator nipples 16a—d, to effect the desired collapsing and expanding of the body portion of the inflations within the shells. When portions of the lid or milker are spoken of as "front" and "rear" portions, these terms are being used in relation to the cow. That is, the portion of the lid here termed the "front" portion is that nearer the front of the cow when the milker is suspended in operative position, as illustrated in Figure 1; and the portion termed the "rear" portion of the lid or milker is that closest to the udder under such conditions.

Referring now more particularly to Figure 2, it will be seen that the connector nipples 15 are mounted in an arc on the lid B, this being on an upward portion of the lid in the particular lid illustrated here, although such is not essential. The nipples preferably extend radially from the arc in which they are placed, as illustrated. In order to achieve the advantages mentioned, the center connector nipples 15b and 15c are effectively a little over ½ inch longer than the outer nipples 15a and 15d; that is, the outer ends of the two center members are about this much differently spaced from the mounting arc than are the ends of the outer two nipples. In order to achieve the benefits of this difference in effective length, I also prefer to have the arc segment occupied by the uniformly spaced nipples at least greater than 90°, preferably in the order of 110°, as illustrated, or even slightly more. Moreover, in order to prevent the difference in length from being nullified by having the milk tubes forced further onto the center nipples than on the outer nipples, I provide the center nipples with stop elements here indicated as welded annular rings 17b and 17c. With this arrangement, the milk tubes can be forced onto all of the various nipples until positively stopped by striking a stopping shoulder, the desired difference in spacing from an arc being thus automatically insured.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A lid for a suspended milker adapted to be supported forwardly of the udder of a cow, comprising a body portion and four milk tube connector nipples mounted thereon and opening therethrough, said nipples being mounted on the lid in an arc of the order of 110° with their axes at the mounting point being in a single plane and extending radially therefrom, the ends of the two center nipples being spaced substantially farther from said arc than the ends of the outer two nipples and said center nipples being adapted to be connected to the rear teats of said udder.

2. A lid for a suspended milker adapted to be supported forwardly of the udder of a cow, comprising a body portion and four milk tube connector nipples mounted thereon and opening therethrough, said nipples being mounted on the lid in an arc and extending radially therefrom, said nipples being uniformly spaced and distributed through a portion of said arc in excess of 90° but not much greater than 110° and the ends of the two center nipples being spaced substantially farther from said arc than the ends of the outer two nipples and said center nipples being adapted to be connected to the rear teats of said udder.

3. Apparatus of the character claimed in claim 1, wherein at least said two center nipples each include a stop element for limiting the extent to which said tubes can be forced onto said nipples.

4. A lid for a suspended milker adapted to be supported forwardly of the udder of a cow, comprising a body portion having at the rear thereof four milk tube connector nipples mounted thereon and opening therethrough, said nipples being generally tubular and having their axes at a small angle to the general plane of the lid, and arranged in an arc and extending radially therefrom, said nipples being uniformly spaced and distributed through a portion of said arc in excess of 90° and not much greater than 110° and the two center nipples being longer than the two outer nipples and wherein at least said two center nipples each include a stop element for limiting the extent to which the milk tubes can be forced onto said nipples, said two center nipples being adapted to be connected to the rear teats of said udder.

5. A suspended milker adapted to be supported forwardly of the udder of a cow, having four milk tube connector nipples mounted thereon and opening therethrough, said nipples being mounted on the lid arranged in an arc of the order of 110° and the two center nipples having a length different from that of the outer two, said two center nipples being adapted to be connected to the rear teats of said udder.

6. A suspended milker adapted to be supported forwardly of the udder of a cow, having four milk tube connector nipples mounted thereon and opening therethrough, said nipples being mounted on the lid with their axes at the mounting point in an arc and extending radially therefrom, said nipples being uniformly spaced and distributed through a portion of said arc in excess of 90° and not much greater than 110° and the ends of the two center nipples being spaced substantially farther from said arc than the ends of the outer two nipples, said two center nipples being adapted to be connected to the rear teats of said udder.

THOMAS B. CRAWFORD.

REFERENCES CITED

The following references are of record in the file of this patent:

UNITED STATES PATENTS

| Number | Name | Date |
|---|---|---|
| 772,421 | Ljungstrom | Oct. 18, 1904 |
| 1,195,996 | Leitch | Aug. 29, 1916 |
| 1,859,214 | McCornack | May 17, 1932 |
| 1,875,083 | McCornack | Aug. 30, 1932 |
| 2,429,983 | Bender et al. | Nov. 4, 1947 |
| 2,461,439 | Perkins | Feb. 8, 1949 |
| 2,513,627 | Dinesen | July 4, 1950 |